United States Patent [19]
Correll et al.

[11] Patent Number: 6,077,610
[45] Date of Patent: Jun. 20, 2000

[54] TWO COMPONENT POWDER COATING SYSTEM AND METHOD FOR COATING WOOD THEREWITH

[75] Inventors: Glenn D. Correll, Birdsboro; Andrew T. Daly, Sinking Spring; Joseph J. Kozlowski; Richard P. Haley, both of Reading; Jeno Muthiah, Wernesville; Paul R. Horinka, Reading; Eugene P. Reinheimer, Wyomissing, all of Pa.

[73] Assignee: Morton International, Inc., Chicago, Ill.

[21] Appl. No.: 08/917,043

[22] Filed: Aug. 19, 1997

Related U.S. Application Data

[60] Division of application No. 08/810,745, Mar. 4, 1997, Pat. No. 5,714,206, which is a continuation-in-part of application No. 08/729,608, Oct. 11, 1996, abandoned, which is a continuation-in-part of application No. 08/643,694, May 6, 1996, abandoned.

[51] Int. Cl.[7] .................................................... B32B 21/08
[52] U.S. Cl. .......................................... 428/413; 428/541
[58] Field of Search ...................................... 428/413, 541

[56] References Cited

U.S. PATENT DOCUMENTS

| | | | |
|---|---|---|---|
| 3,384,610 | 5/1968 | Lee | 260/37 |
| 5,212,263 | 5/1993 | Schreffler | 525/533 |

FOREIGN PATENT DOCUMENTS 2418754  11/1974  Germany .

*Primary Examiner*—Erma Cameron
*Attorney, Agent, or Firm*—Robert M. Didrick; Gerald K. White

[57] ABSTRACT

Wood is electrostatically coated with a thermosetting powder coating system in which a mixture of a self-curing epoxy resin and a catalyst therefore is extruded and a low temperature curing agent are both pulverized and the powders are blended with conventional additives to make a coating powder which is deposited on a wooden substrate and heated to cure. The mixture of resin and catalyst does not cure within the extruder but it is made to cure at low temperatures by the separate addition of the curing agent. A small amount of the low temperature curing agent, insufficient to cause substantial curing during extrusion may be used in place of the catalyst.

18 Claims, No Drawings ary. It was surprising, also, that a low gloss film was
TWO COMPONENT POWDER COATING SYSTEM AND METHOD FOR COATING WOOD THEREWITH This is a divisional of application Ser. No. 08/810,745 filed on Mar. 4, 1997 now U.S. Pat. No. 5,714,206; which is a C-I-P of Ser. No. 08/729,608 filed Oct. 11, 1996 abandoned; which is a C-I-P of Ser. No. 08/643,694 filed May 6, 1996 abandoned.

BACKGROUND OF THE INVENTION

This invention relates to a two-component powder coating system by which the curing of a coating occurs at a significantly faster rate and/or at a significantly lower temperature and produces an exceptionally smooth surface. This invention also relates to thermally stable powder coating whereby white coatings do not yellow during thermal curing. This invention also relates to the electrostatic coating of metal and, in particular, to the triboelectric coating of wood with a coating powder and low temperature curing of that coating having a pleasing smoothness.

Traditionally, coating powders have been made by the extrusion of a mixture of resins and curing agents to obtain a homogeneous mixture and then grinding the extrudate and screening the comminuted product to obtain the desired particle sizes and particle size distribution. The powder is then electrostatically sprayed onto a substrate, traditionally a metal substrate, and cured at temperatures much higher than 200° F. The curing of powder coatings on heat sensitive materials such as wood, plastic, and the like has been limited by the fact that the extrusion of a mixture of a resin and a low temperature curing agent, i.e., one that is active at 200° F. or less, would cause the coating powder to gel in the extruder because the extrusion typically generates enough heat to raise the temperature to 200° F. or higher. It has been thought throughout the art that the curing agent must be mixed with the resin by extrusion to obtain a uniform cure and film appearance. It has also been commonly accepted that a low gloss film must be cured at a high temperature, e.g., about 300° F. or higher.

The powder coating of wood has been much talked about in the literature but very little has been said as to how it may be accomplished. As Douglas S. Richart said in his article published in the April, 1996 issue of POWDER COATINGS, the coating of wood with a low temperature cure powder is next to impossible because the coating must be cured at a temperature below 200° F. and the resin must have a flow temperature of about 10 to 20 degrees lower than that. Such a resin tends to block during storage at normal temperatures. Richart goes on to say that the curing agent must be sufficiently reactive that the powder will cure in a reasonable time at such low temperatures. But that leads to a possible thermosetting of the resin in the extruder. He speaks of electrostatically spraying a powder having a blocked isocyanate onto wood, heating the coating in infra-red and other type ovens to form a smooth coating and curing the smooth coating with ultra-violet radiation.

In its technical bulletins, Boise Cascade shows the use of hand-held electrostatic spray guns in coating its electrically conducting particleboard.

In this invention, the epoxy resin is first extruded with a small amount of catalyst or with a low level of a low temperature curing agent and then ground and classified in the usual manner. Additional amounts of the low temperature curing agent in powder form are then blended with the powdered extrudate raise the level of curing agent while avoiding the pre-gelation problem. Surprisingly, the time required to obtain a smooth cured film is lowered significantly. It was surprising, also, that a low gloss film was achieved at cure temperatures much lower than 300° F.

SUMMARY OF THE INVENTION

It is an object of this invention, therefore, to provide a coating powder for heat sensitive substrates.

It is a related object of this invention to provide a method for coating wood without the problems associated with volatile organic solvents.

It is another object of this invention to provide a low temperature process for producing a smooth, low gloss coating on wood.

These and other objects of the invention which will become apparent from the following description are achieved by a thermosetting powder coating system in which the thermosetting of an extruded mixture of a self-curing epoxy resin and (A) a catalyst or (B) an amount of a low temperature curing agent insufficient to cause substantial curing of the resin during extrusion is facilitated by the separate addition of a low temperature curing agent; said extruded mixture and said separately added low temperature curing agent both being in powder form and being blended to form a coating powder.

DETAILED DESCRIPTION OF THE INVENTION

The curing system of this invention may be used in coating glass, ceramics, and graphite-filled composites as well as metallic substrates such as steel and aluminum but its particular utility in the coating of heat sensitive subsrates such as plastics, paper, cardboard and woods makes it highly appealing as a commercially viable alternative to the liquid coatings that have been almost universally used in the past. For the purposes of this invention, wood is defined as any lignocellulosic material whether it comes from trees or other plants and whether it be in its natural forms, shaped in a saw mill, separated into sheets and made into plywood, or chipped and made into particleboard, or its fibers have been separated, felted, and compressed. It is exemplified by lumber, panels, molding, siding, oriented strand board, hardboard, medium density fiberboard, and the like. The particle board may be standard or treated to enhance its electrical conductivity. Wood having a moisture content of from 3 to 10% by weight is suitable for the purposes of this invention. A porous particleboard, pre-coated with a conductive liquid coating composition and cured, may also serve as a substrate for the coating powder of this invention. For example, a smooth 2–3 mil thick powder coating is achieved on a 0.5 to 1 mil thick UV or thermally cured pre-coat. Without the precoat, a smooth powder coating must be about 9 mils thick.

A particularly favored embodiment of the system is one in which competing reactions are taking place simultaneously, said reactions being:

(A) a catalyzed self-curing of a portion of an epoxy resin present in an extruded mixture of the resin and a catalyst, and (B) a crosslinking reaction between another portion of the extruded resin and a low temperature curing agent.

Epoxy resins which are useful in the practice of this invention are exemplified by, but not limited to, those produced by the reaction of epichlorohydrin and a bisphenol, e.g., bisphenol A. Preferred epoxy resins include those sold under the trademarks ARALDITE GT-7072, 7004, 3032, 6062, and 7220, and EPON 1007F, 1009F, and 1004, all of which are 4,4'-isopropylidenediphenol-epichlorohydrin resins.

The epoxy resin is self-curing, i.e., it reacts via homopolymerization during curing of the powder coating. Generally, a catalyst is required to cause the reaction to progress at a commercially acceptable rate. A preferred catalyst for this invention is an epoxy adduct of an imidazole having the general formula:

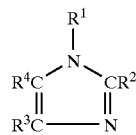

wherein $R^1$, $R^2$, $R^3$, and $R^4$ are independently hydrogen or any substituent which is not reactive with the epoxy resin. Examples of suitable imidazoles include imidazole, 2-methyl imidazole, and 2-phenyl imidazole. Suitable adducts of such imidazoles with a bisphenol A epoxy resin are available commercially from Shell Chemical Company under its trademark EPON, e.g., EPON P-101, and also from Ciba-Geigy Corporation under its designation XU HT 261. For the purposes of this invention, the term imidazole is used herein to mean both the substituted and unsubstituted imidazoles. Although applicants are not bound to any theory, it is believed that an imidazole adducts to epoxy resins by an opening of the epoxy ring that results in the epoxy oxygen bonding to the C=N bond of the imidazole ring. The adducted imidazole acts as a catalyst, moving from one epoxy group to another as it facilitates epoxy ring opening and cure reactions. Imidazoles, in themselves, tend to be insoluble in epoxy resins. Thus, the purpose for adducting them to an epoxy resin is to make them compatible with the epoxy system. As a catalyst, the imidazole adduct is used in the systems, methods, and powders of this invention at a level of from about 0.1 to about 8 parts per hundred parts of the extruded resin (phr), preferably at about 2 phr. For enhanced color stability, the 2-phenyl imidazole may be used as the catalyst for curing the epoxy resin with or without the low temperature curing agent. The 2-phenyl imidazole, which is available from the SWK Chemical Co., may be used as such at accordingly lower levels.

The imidazoles, as adducts or non-adducts, may also used at higher levels as a separately added curing agent to the extruded mixture of the resin and catalyst. When this is done, the amount of imidazole adduct is controlled so that the total amount is no more than about 12 phr.

Otherwise, the low temperature curing agent may be selected from among the many that are commercially available but an epoxy adduct of an aliphatic polyamine having a primary amino group is preferable. A suitable curing agent of that type is available from Ciba Ceigy as its PF LMB 5218 hardener. A similar product is sold under the trademark ANCAMINE 2337 XS by Air Products & Chemicals. An epoxy adduct of an aliphatic polyamine having a secondary amino group available under the trademark ANCAMINE 2014 AS is preferred for white and light colored coatings. The amount of low temperature curing agent that may be added separately as component (B) to the pulverized extrudate of resin and catalyst is from about 2 to about 40 phr and the preferred amount is from about 30 to about 35 phr. The ratio of the low temperature curing agent to the catalyst in the extrudate is from about 1:3 to about 400:1 but preferably from about 2:1 to about 15:1.

The coating powder may also contain a flow control agent in the range of from about 0.5 to about 2.0 phr. Examples of the flow control agents include the MODAFLOW poly (alkylacrylate) products and the SURFYNOL acetylenic diols; they may be used singly or in combination. Anti-oxidants may also be used at a concentration of from about 0.5 to about 2.0 phr to prevent the discoloration of the coatings even at the relatively low curing temperatures suitable for the purposes of this invention. Examples of the anti-oxidants that are useful in this invention include sodium hypophosphite, tris-(2,4-di-t-butyl phenyl) phosphite (sold under the trademark IRGAFOS 168), and calcium bis ([monoethyl(3,5-di-t-butyl-4-hydroxybenzyl)phosphonate] (sold under the trademark IRGANOX 1425). Mixtures of anti-oxidants may be used.

Pigments, optical brighteners, fillers such as calcium carbonate and bentonite clays, texturizing agents such as particulate rubber, and other conventional additives may also be present. A particularly desirable textured finish may be obtained by the addition of from about 14 to about 20 phr of the rubber to the coating composition along with calcium carbonate at a rubber to carbonate ratio of from about 0.7:1 to about 1.5:1 by weight. Titanium oxide, in an amount of from about 5 to about 50 phr or more, is an example of a pigment that may be used. An optical brightener, exemplified by 2,2'-(2,5-thiophenediyl)bis[5-t-butylbenzoxazole, sold under the trademark UVITEX OB, may be present at from about 0.1 to about 0.5 phr.

For the purposes of this invention, the term resin includes the resin per se and the crosslinking agent whether it is in the extrudate or it is added separately but it does not include the catalyst.

The coating powder of this invention may be applied by any of the conventional powder coating methods but the application of the powder by triboelectric guns is preferred in particular situations such as when the wooden substrate is profiled. The grooves and ridges present a particular problem for electrostatic coating processes because of the Faraday effect. Because the electrical field generated by friction as the powder flows along the TEFLON plastic surfaces inside the gun is relatively small in comparison with the field in a corona-discharge cloud, the powder particles may be deposited more efficiently into Faraday cage areas with triboelectric guns. Wooden cabinet doors are examples of a profiled wooden substrate as are the doorskins represented by the drawings in U.S. Pat. No. 5,489,460, which is incorporated herein by reference to further illustrate the type of wooden panels that are particularly susceptible to powder coating by the method of this invention. The grooves and sharp edges of such panels are covered very well on a flat line coating apparatus with nozzles arrayed to direct a portion of the powder against them.

Such panels as well as flat-surfaced panels such as those used to make ping-pong tables are particularly well coated by triboelectric guns on a flat line conveyor having electrically conductive bands around the circumference of the conveyor belt. Apparatus for such coating is disclosed in a series of patents assigned to the Nordson Corporation. These are U.S. Pat. Nos. 4,498,913; 4,590,884; 4,723,505; 4,871,380; 4,910,047; and 5,018,909; all of which are incorporated herein by reference. A suitable flat line powder coating apparatus comprises such a conveyor extending through a powder coating booth, wherein a wooden article supported and moved by the conveyor belt is coated triboelectrically by a plurality of guns situated adjacent one another and in one or more tiers. The powder is forced into the guns under about 40 psi pressure and air at about 20 psi is passed into the powder conduits just before the powder passes into the nozzles. The article bearing the powder is then conveyed through a curing oven having several heating zones, some of which are heated by IR lamps, others by heat convection, and still others by a combination of those two. The coating and curing line speeds may be the same or different depending on the the length of the curing oven. The line speed through the powder application booth may be from about 5 to about 150 feet per minute but it is preferably from about 20 to about 100 feet per minute. The line speed through the curing oven, on the other hand, may be from about 5 to about 20 feet per minute, depending on the oven temperature and the particular coating powder used. The curing temperature may range from about 180° up to but not including the decomposition temperature of the powder. It is preferred to maintain the cure temperature within the range of from about 190° to about 290° F. and still more preferred to keep the cure temperature at from about 250 to about 290° F. When a crystalline epoxy resin is used, a cure temperature of about 180° F. is particularly suitable. It is preferred that the coating and curing line speeds be adjusted to the oven length so that they are balanced.

Preheating of the panel before the coating step is preferred in some instances, e.g., to help the powder reach its flow temperature in the first zone of the oven and it also minimizes outgassing during cure. The oven may have several heating zones of the IR and convection types and also a combination of the two. The TRIAB Speedoven sold by Thermal Innovations Corporation is suitable for the purposes of this invention. A wooden panel bearing a coating powder of this invention may be cured in a gas-fired IR oven available from Thermal Innovations Corporation by pre-heating the panel in the oven at an emitter temperature of about 1800° F. for from about 4 to about 10 seconds and post-heating at the same emitter temperature for from about 6 to about 10 seconds. When a medium density fiberboard (at about 40° F.), was pre-heated and post-heated at 1800° F. for about 6 seconds and 6.5 seconds, respectively, the surface of the panel next to the IR emitter was about 310° F. after the pre-heating and the post-heating, alike. The surface opposite the IR emitter was about 50° F. as it left the oven. Such relatively cool panels may be stacked atop one another as they come out of the oven. A higher emitter temperature may be used for proportionally shorter times.

The film thickness of the cured coating is at least about 1 mil and it may be as much as about 8 mils or even higher if there is a practical need for such. Film thicknesses of from about 4 to about 6 mils are achieved regularly by the method of this invention, even at coating line speeds of about 100 feet per minute.

The invention is more specifically described in the following working examples wherein parts are by weight unless otherwise stated.

EXAMPLES 1–4 and CONTROL

Coating powders were made as described above from the following components:

| COMPONENTS | (A) RESIN WITH CATALYST & PIGMENT | (A*) RESIN PIGMENT ONLY | (A**) CRYSTALLINE EPOXY | (B) PIGMENT & CURING AGENT | (B*) CATALYST |
|---|---|---|---|---|---|
| Crystalline Epoxy RSS 1407 | — | — | 50 | — | — |
| Epoxy Resin GT-7072 | 100 | 100 | 50 | — | — |
| Imidazole Adduct P-101 | 2 | — | — | — | 100 |
| Acrylate Flow Acid | 1.4 | 1.4 | 1.4 | 1.4 | — |
| Benzoin | .8 | .8 | — | .8 | — |
| Pigments | .079 | .079 | — | .079 | — |
| TiO₂R-902 | 60 | 60 | — | 60 | — |
| Amine Adduct LMB-5218 | — | — | — | 100 | — |
| UVI 6974 Catalyst* | — | — | 2 | — | — |

*substantially non-functional under these conditions

TABLE 1

| EXAMPLE | 1 | 2 | 3 | 4 | Control Conventional Extrusion |
|---|---|---|---|---|---|
| Component A | 70 | — | 100 | — | 100 |
| Component A* | — | 70 | — | — | — |
| A** | — | — | — | 70 | — |
| Component B | 30 | 30 | — | — | — |
| Component B* | — | — | 3 | — | — |
| LMB 5218 adduct | — | — | — | 30 | — |

The powders of these examples were electrostatically coated on steel panels and cured at 225° F. for 10 minutes to obtain 1.8–2.2 mil thick films. As shown in Table 2, the superior solvent resistance of Examples 1 and 3 demonstrate that faster cure is achieved using this technology. Neither the conventionally extruded material (Control) nor the blend with no catalyst in Component A (Example 2) achieved full cure.

TABLE 2

| EXAMPLE | 1 | 2 | 3 | 4 | Control |
|---|---|---|---|---|---|
| MEK Resistance (50 Double Rubs) | Moderate Rub Off | Rubs Through | No Effect | Moderate Rub Off | Rubs Through |
| Impact Resistance (Direct) | 140 in-lbs | 80 in-lbs | 60 in-lbs | 100 in-lbs | 0 in-lbs |
| 60° Gloss | 40 | 15 | 78 | 32 | 80 |
| Orange Peel | Slight | Moderate | Slight | Very Slight | Slight |

EXAMPLES 5–8

TABLE 3

| Ex. # | Powder | Substrate | Line Speed of Coating | Preheat Setting IR or Conv. | Line Speed in Curing Oven | Actual Temp. Exiting IR | Appearance | Mek Rate 50 Double Rub | Thickness |
|---|---|---|---|---|---|---|---|---|---|
| 5 | Ex. 1 | MDF | 30 ft/min | None | 5 ft/min | 290° F. | No outgassing/slight yellow Low Gloss/Smooth | #4 | 4+ |
| 6 | Ex. 1 | MDF | 30 ft/min | None | 6 ft/min | 240° F. | Slight Outgassing/white Higher Gloss/Slight OP | #3 | 4+ |
| 7 | Ex. 1 | MDF | 30 ft/min | None | 5 ft/min | 260° F. | No outgassing/slight yellow Low Gloss/Smooth | #4 | 4+ |
| 8 | Ex. 1 | MDF | 30 ft/min | Yes 5 ft/min preheat speed 180–200° F. | 10 ft/min | 250–280° F. | No outgassing/slight yellow Low Gloss/Smooth | #4 | 4+ |

EXAMPLES 9 & 10

Coating powders were made as described above from the following components:

| COMPONENTS | (A) | (B) | (C) | (D) |
|---|---|---|---|---|
| Epoxy Resin GT-7072 | 100 | — | 100 | — |
| Imidazole Adduct P-101 | 2.0 | — | — | — |
| 2-Phenyl imidazole | — | — | 2.0 | — |
| Flow Aids | | | | |
| MODAFLOW 2000 | 1.0 | 1.0 | 1.0 | 1.0 |
| (SURFYNOL-104-S) | 1.0 | 1.0 | 1.0 | 1.0 |
| TiO$_2$ R-902 | 30 | 30 | 30 | 30 |
| Amine Adduct LMB-5218 | — | 100 | — | 100 |
| Polyethylene (Grade 6A) | 2.0 | 2.0 | 2.0 | 2.0 |
| Sodium hypophosphite | 1.0 | 1.0 | 1.0 | 1.0 |
| Optical brightener | 0.1 | 0.1 | 0.1 | 0.1 |

TABLE 4

| EXAMPLE | Component A | Component B | Component C | Component D |
|---|---|---|---|---|
| 9 | 65 | 35 | — | — |
| 10 | — | — | 70 | 30 |

EXAMPLES 11–15

The coating powders of Examples 9 and 10 were deposited on pre-heated wooden panels by tribocharging guns and post-heated on a flat-line conveyor in an oven heated by IR and convection heating according to the conditions given in Table 5 wherein the results are given also.

EXAMPLES 16–18

The coating powder of Example 16 is the same as that of example 1 except for the addition of 0.1 part by weight of an optical brightener to both Components A and B. The coating powder of Example 17 is the same as that of Example 16 except for the addition of 1.0 part by weight of IRGAFOS 168 anti-oxidant to both Components A and B of the powder of Example 16. The coating powder of Example 18 is the same as that of Example 16 except for the addition of 1.0 part of IRGANOX 1425 to both Components A and B of the powder of Example 16. A coating powder of Comparative Example 1 is the same as the powder of Example 16 except for the addition of 1.0 part of IRGANOX 1098 to both Components A and B of the powder of Example 16. The powders of Examples 9 and 16–18, as well as the powder of the Comparative Example were deposited by a hand-operated tribocharging gun on to a surface of a 0.5 inch thick wooden panel whose temperature was about 230–250° F. and then cured at 300–310° F. for 30 and 60 seconds. The powders of Examples 1, 9, and 10 were deposited by a hand-operated tribocharging gun on to a surface of a 0.75 inch thick wooden panel whose temperature was about 250–270° F. and then cured at 300–310° F. for 30, 60, and 90 seconds. The SK white color shift of each cured coating, as measured with a MacBeth 2020+ spectrophotometer using the CIELAB COLORSPACE Delta B$^{+(+)}$ yellowness scale, is given in Table 6.

TABLE 5

| Ex. # | Powder | Substrate | Line Speed of Coating | Board Temperature Before Coating | Line Speed in Curing Oven | Actual Temp. Exiting IR | Appearance | Mek Rate 50 Double Rub | Thickness |
|---|---|---|---|---|---|---|---|---|---|
| 11 | Ex. 9 | MDF | 30 ft/min | 290 (° F.) | 15 ft/min | 290° F. | Good | #4 | 5 mils |
| 12 | Ex. 9 | UV-P* | 30 ft/min | 280 (° F.) | 15 ft/min | 300° F. | Very good | #4–5 | 5 mils |
| 13 | Ex. 9 | UV-P* | 100 ft/min | 290 (° F.) | 15 ft/min | 290° F. | No pinholes | #4–5 | 3+ |
| 14 | Ex. 9 | MDF | Hand spray | 280° F. | 5 ft/min | 280° F. | Very slightly yellow Smooth | — | — |
| 15 | Ex. 10 | MDF | 20 ft/min | 280° F. | 5 ft/min | 285° F. | Whiter than Ex. 14 Slight Microtexture | — | — |

*UV-P stands for particleboard pre-coated with a UV cured liquid coating

TABLE 6

| EXAMPLE | Panel Thickness | Delta B*+ 30 secs. | 60 secs. | 90 secs |
|---|---|---|---|---|
| 9 | 0.5 in. | 1.7 | 2.0 | — |
| 16 | " | 3.9 | 7.9 | — |
| 17 | " | 2.1 | 3.0 | — |
| 18 | " | 3.4 | 6.0 | — |
| Comp. Ex. | " | 7.7 | 13.5 | — |
| 1 | 0.75 in. | 4.7 | 9.1 | 9.5 |
| 9 | " | 2.5 | 4.2 | 4.5 |
| 10 | " | 1.5 | 2.7 | 2.8 |

EXAMPLE 19

COMPONENTS

|  | (A) | (B) |
|---|---|---|
| Epoxy Resin GT-7072 | 100 | — |
| Imidazole Adduct P-101 | 2.0 | — |
| Flow Aid | 1.0 | 1.0 |
| Carbon black | 3.0 | 3.0 |
| Amine Adduct LMB-5218 | — | 100 |
| Polyethylene (Grade 6A) | 2.0 | 2.0 |
| Calcium carbonate | 15.0 | 15.0 |
| Nitrile rubber (NIPOL 1422) | 17.0 | 17.0 |

A cured coating having a tight, fine texture, and a slightly dry feel was obtained when a coating powder, made as described above and having a 70:30 weight ratio of Component A to Component B, was sprayed onto a horizontal panel which had been pre-heated for 5 minutes in a 350° F. oven and then heated for 10 minutes at the same temperature. The cured coating had an MEK rating of 4. When the oven temperatures was 300° F., the MEK rating was the same but the coating felt less dry.

The subject matter claimed is:

1. An article coated with a fused and cured coating powder which comprised an extruded mixture of a self-curing epoxy resin and (A) a catalyst or (B) an amount of a low temperature curing agent insufficient to cause substantial curing of the resin during extrusion, and an amount of the same or different low temperature curing agent sufficient to complete the cure, said catalyst being epoxy adduct of an imidazole having the general formula:

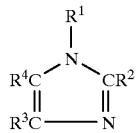

wherein $R^1$, $R^2$, $R^3$, and $R^4$ are independently hydrogen or any substituent which is not reactive with the epoxy resin.

2. The article of claim 1 wherein the weight ratio of curing agent to catalyst in the coating powder is from about 2:1 to about 15:1.

3. The article of claim 1 wherein the amount of catalyst in the coating powder is about 2 parts per hundred parts of the extruded resin.

4. The article of claim 1 wherein the low temperature curing agent of reaction (B) is an epoxy resin adduct of an aliphatic polyamine.

5. The article of claim 1 wherein the epoxy resin is crystalline.

6. The article of claim 1 wherein $R^2$ is methyl, and $R^1$, $R^3$, and $R^4$ are hydrogen.

7. The article of claim 1 further characterized by being made of wood, paper, plastic, or cardboard.

8. A paper article coated with a fused and cured coating powder which comprised an extruded mixture of a self-curing epoxy resin and (A) a catalyst or (B) an amount of a low temperature curing agent insufficient to cause substantial curing of the resin during extrusion, and an amount of the same or different low temperature curing agent sufficient to complete the cure, said catalyst being an epoxy adduct of an imidazole having the general formula:

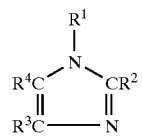

wherein $R^1$, $R^2$, $R^3$, and $R^4$ are independently hydrogen or any substituent which is not reactive with the epoxy resin.

9. A wooden article coated with a fused and cured coating powder which comprised an extruded mixture of a self-curing epoxy resin and (A) a catalyst or (B) an amount of a low temperature curing agent insufficient to cause substantial curing of the resin during extrusion, and an amount of the same or different low temperature curing agent sufficient to complete the cure, said catalyst being an epoxy adduct of an imidazole having the general formula:

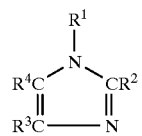

wherein $R^1$, $R^2$, $R^3$, and $R^4$ are independently hydrogen or any substituent which is not reactive with the epoxy resin.

10. A plastic article coated with a fused and cured coating powder which comprised an extruded mixture of a self-curing epoxy resin and (A) a catalyst or (B) an amount of a low temperature curing agent insufficient to cause substantial curing of the resin during extrusion, and an amount of the same or different low temperature curing agent sufficient to complete the cure, said catalyst being an epoxy adduct of an imidazole having the general formula:

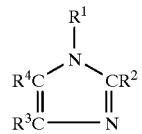

wherein $R^1$, $R^2$, $R^3$, and $R^4$ are independently hydrogen or any substituent which is not reactive with the epoxy resin.

11. An article coated with a fused and cured coating powder which comprised an extruded mixture of an epoxy resin and (A) a catalyst or (B) an amount of a low temperature curing agent insufficient to cause substantial curing of the resin during extrusion, and an amount of the same or different low temperature curing agent sufficient to complete the cure, wherein the curing agent of (B) is an epoxy adduct of an aliphatic polyamine having a primary or a secondary amino group.

12. The article of claim 11 wherein the catalyst is wherein the catalyst is an imidazole having the general formula:

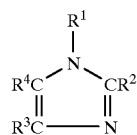

wherein $R^1$, $R^2$, $R^3$, $R^4$ are independently hydrogen or any substituent which is not reactive with the epoxy resin.

13. A paper article coated with a fused and cured coating powder which comprised an extruded mixture of an epoxy resin and (A) a catalyst or (B) an amount of a low temperature curing agent insufficient to cause substantial curing of the resin during extrusion, and an amount of the same or different low temperature curing agent sufficient to complete the cure, wherein the curing agent of (B) is an epoxy adduct of an aliphatic polyamine having a primary or a secondary amino group.

14. The article of claim wherein the catalyst is an imidazole having the general formula:

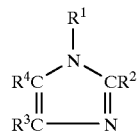

wherein $R^1$, $R^2$, $R^3$, $R^4$ are independently hydrogen or any substituent which is not reactive with the epoxy resin.

15. A wooden article coated with a fused and cured coating powder which comprised an extruded mixture of an epoxy resin and (A) a catalyst or (B) an amount of a low temperature curing agent insufficient to cause substantial curing of the resin during extrusion, and an amount of the same or different low temperature curing agent sufficient to complete the cure, wherein the curing agent of (B) is an epoxy adduct of an aliphatic polyamine having a primary or a secondary amino group.

16. The article of claim wherein the catalyst is an imidazole having the general formula:

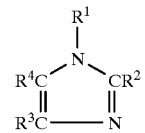

wherein $R^1$, $R^2$, $R^3$, $R^4$ are independently hydrogen or any substituent which is not reactive with the epoxy resin.

17. A plastic article coated with a fused and cured coating powder which comprised an extruded mixture of an epoxy resin and (A) a catalyst or (B) an amount of a low temperature curing agent insufficient to cause substantial curing of the resin during extrusion, and an amount of the same or different low temperature curing agent sufficient to complete the cure, wherein the curing agent of (B) is an epoxy adduct of an aliphatic polyamine having a primary or a secondary amino group.

18. The article of claim 17 wherein the catalyst is an imidazole having the general formula:

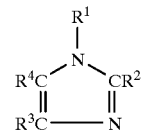

wherein $R^1$, $R^2$, $R^3$, $R^4$ are independently hydrogen or any substituent which is not reactive with the epoxy resin.

* * * * *